United States Patent [19]

Nowlin

[11] Patent Number: 4,618,662
[45] Date of Patent: Oct. 21, 1986

[54] CATALYST COMPOSITION FOR POLYMERIZING ALPHA-OLEFINS

[75] Inventor: Thomas E. Nowlin, Yanbu, Saudi Arabia

[73] Assignee: Mobil Oil Corporation, New York, N.Y.

[21] Appl. No.: 603,048

[22] Filed: Apr. 23, 1984

[51] Int. Cl.$^4$ .............................. C08F 4/02; C08F 10/00
[52] U.S. Cl. ..................................... 526/129; 502/110; 502/115; 502/120; 526/97; 526/114; 526/119; 526/124; 526/348.5; 526/352; 526/151
[58] Field of Search ............... 502/110, 114, 104, 120, 502/115; 526/97, 119, 124, 129, 114, 151

[56] References Cited

U.S. PATENT DOCUMENTS

| | | | |
|---|---|---|---|
| 3,787,384 | 1/1974 | Stevens et al. ........................ | 526/129 |
| 3,901,863 | 8/1975 | Berger et al. ........................ | 526/129 |
| 3,991,259 | 11/1976 | Piekarski et al. .................... | 526/119 |
| 4,063,009 | 12/1977 | Ziegler et al. ........................ | 526/159 |
| 4,076,698 | 2/1978 | Anderson et al. .................... | 526/348 |
| 4,105,846 | 8/1978 | Hoff et al. ............................ | 526/124 |
| 4,115,319 | 9/1978 | Scata et al. ............................ | 526/128 |
| 4,128,502 | 12/1978 | Kildahl et al. ........................ | 252/431 |
| 4,148,754 | 4/1979 | Strobel et al. ........................ | 252/429 |
| 4,173,547 | 1/1979 | Graff ..................................... | 526/129 |
| 4,199,476 | 4/1980 | Melquist et al. ...................... | 252/431 |
| 4,218,339 | 8/1980 | Zucchini et al. . | |
| 4,245,071 | 1/1981 | Kondo et al. ......................... | 526/114 |
| 4,288,578 | 9/1981 | Hsieh .................................... | 526/119 |
| 4,296,223 | 10/1981 | Berger .................................. | 526/125 |
| 4,302,566 | 11/1981 | Karol et al. .......................... | 526/125 |
| 4,357,448 | 11/1982 | Tsubaki et al. . | |
| 4,383,096 | 5/1983 | Shida et al. ........................... | 526/129 |
| 4,440,869 | 4/1984 | Shannon et al. . | |
| 4,451,574 | 5/1984 | Johnson ................................ | 526/129 |
| 4,458,027 | 7/1984 | Berge et al. . | |
| 4,458,058 | 7/1984 | Dombro ................................ | 526/129 |
| 4,471,066 | 9/1984 | Sakurai et al. ....................... | 526/114 |
| 4,508,843 | 4/1985 | Etherton et al. ..................... | 526/129 |
| 4,511,669 | 4/1985 | Gessell . | |

Primary Examiner—Edward J. Smith
Attorney, Agent, or Firm—Alexander J. McKillop; Michael G. Gilman; Stanislaus Aksman

[57] ABSTRACT

A catalyst composition for polymerizing alpha-olefins is prepared by treating a carrier containing OH groups with an organomagnesium composition and contacting the thus-formed magnesium-containing carrier with a solution of a titanium (IV) alkoxide and a brominating and/or chlorinating agent. The adjustment of the molar ratio of the brominating and/or chlorinating agent to the titanium alkoxide yields catalysts which produce polymers of varying molecular weight distribution, as measured by the melt flow ratio (MFR) values. Also disclosed is a process for polymerizing alpha-olefins in the presence of the catalyst composition.

88 Claims, 5 Drawing Figures

CATALYST COMPOSITION FOR POLYMERIZING ALPHA-OLEFINS

BACKGROUND OF THE INVENTION

1. Field of the Invention

The present invention relates to a method for polymerizing alpha-olefins, a catalyst for such a polymerization method and a method of producing such a catalyst. A particular aspect of the present invention relates to a method for producing linear low density polyethylene.

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describes a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound would seem to be present when the reacted support is contacted with the tetravalent titanium compound.

Ziegler, deceased, et al, U.S. Pat. No. 4,063,009, describes a catalyst which is the reaction product of an organomagnesium compound (e.g., an alkylmagnesium halide) with a tetravalent titanium compound. This reaction with the tetravalent titanium compound takes place in the absence of a support material.

Melquist et al, U.S. Pat. No. 4,199,476, the entire contents of which are incorporated herein by reference, discloses an alpha-olefin polymerization catalyst comprising: (A) a solid component which is the reaction product of (1) of an alkylaluminum halide and (2) a liquid reaction product prepared by reacting a magnesium (II) alkoxide and a titanium (IV) alkoxyhalide in the absence of hydrocarbon diluent, and (B) an organoaluminum promoter.

Most of the aforementioned patents wherein an organomagnesium compound and a tetravalent titanium compound, e.g., a titanium alkoxyhalide, are used to produce catalysts for polymerization of ethylene, alone or in combination with 1-olefins (also known as alpha-olefins), teach the necessity of using such amounts of the organomagnesium compounds that are necessary to react with the hydroxyl (OH) groups on the carrier, i.e., stoichiometric amounts of the organomagnesium compounds. The catalysts produced in accordance with the teachings of the aforementioned patents yield polyethylene polymers having relatively narrow molecular weight distribution, as evidenced by relatively low melt flow ratio (MFR) values.

SUMMARY

The present invention relates to a process for preparing a supported catalyst composition for use in alpha-olefin polymerization reactions, said process comprising the steps of:

(i) contacting a solid, porous carrier having reactive OH groups with a liquid, said liquid containing at least one organomagnesium composition having the empirical formula

$$R_n MgR'_{(2-n)} \qquad (I)$$

where R and R' are the same or different and they are $C_1$–$C_{12}$ hydrocarbyl groups, provided that R' may also be halogen, and n is 0, 1 or 2, the number of moles of said organomagnesium composition being in excess of the number of moles of OH groups on said carrier;

(ii) removing said liquid from step (i) to obtain a magnesium-containing carrier in the form of a dry, free-flowing powder; and (iii) contacting said powder of step (ii) with a solution comprising a liquid medium, a brominating and/or chlorinating agent, and at least one titanium (IV) alkoxide compound, said titanium alkoxide compound, said brominating and/or chlorinating agent, being soluble in said liquid medium, and said magnesium-containing carrier being essentially insoluble in said liquid medium, whereby a compound of titanium which is insoluble in said liquid medium becomes incorporated onto said carrier.

The present invention also relates to a process for preparing a supported catalyst composition for use in alpha-olefin polymerization reactions, said process comprising the steps of:

(i) contacting a silica carrier having from about 0.1 to about 2.0 mmoles/g of OH groups with a liquid, said liquid containing at least one organomagnesium composition having the empirical formula

$$RMgR' \qquad (II)$$

where R is a $C_1$–$C_{12}$ hydrocarbyl group and R' is halogen, at least a portion of said organomagnesium composition being soluble in said liquid, the ratio of the number of moles of said organomagnesium composition to the number of moles of OH groups on said silica being from about 1.1 to about 3.5, (ii) removing said liquid from step (i) to incorporate magnesium onto said carrier, said incorporated magnesium being selected from the group consisting of magnesium halide, unreacted organomagnesium composition and mixtures thereof, whereby a magnesium-containing carrier in the form of a dry, free-flowing powder is formed; and (iii) contacting said powder of step (ii) with a solution comprising a liquid medium, a brominating and/or chlorinating agent, and at least one titanium (IV) alkoxide compound, the number of moles of said titanium (IV) alkoxide compound being in excess of the stoichiometric amount thereof, said titanium (IV) alkoxide compound, said brominating and/or chlorinating agents, being soluble in said liquid medium, and said magnesium-containing carrier being essentially insoluble in said liquid medium, whereby a compound of titanium which is insoluble in said liquid medium becomes incorporated onto said carrier.

The present invention further relates to a process for preparing a copolymer of ethylene and one or more $C_3$-$C_{10}$ alpha olefins having a density of about 0.910 to about 0.970 gms/cc and a melt flow ratio (MFR) of about 25 to about 65, said process comprising conducting the polymerization in the presence of a catalyst prepared by a process comprising the steps of:

(i) contacting a solid, porous carrier having reactive OH groups with a liquid, said liquid containing at least one organomagnesium composition having the empirical formula

$$R_n MgR'_{(2-n)} \qquad (I)$$

where R and R' are the same or different and they are $C_1$-$C_{12}$ hydrocarbyl groups, provided that R' may also be halogen, and n is 0, 1 or 2, the number of moles of said organomagnesium composition being in excess of the number of moles of OH groups on said carrier;

(ii) removing said liquid from step (i) to obtain a magnesium-containing carrier in the form of a dry, free-flowing powder; and (iii) contacting said powder of step (ii) with a solution comprising a liquid medium, a brominating and/or chlorinating agent, and at least one titanium (IV) alkoxide compound, said titanium alkoxide compound, said brominating and/or chlorinating agent being soluble in said liquid medium, and said supported magnesium-containing carrier being essentially insoluble in said liquid medium, whereby a compound of titanium which is insoluble in said liquid medium becomes incorporated onto said carrier.

The present invention further relates to a process for preparing a polyethylene copolymer which is an ethylene/1-hexene copolymer having a density of about 0.910 to about 0.970 gms/cc and a melt flow ratio (MFR) of about 25 to about 65, said process comprising conducting the polymerization in a gas phase, fluid bed reactor in the presence of a catalyst produced by a process comprising the steps of:

(i) contacting a silica carrier having from about 0.1 to about 2.0 mmoles/g of OH groups with a liquid, said liquid containing at least one organomagnesium composition having the empirical formula

$$RMgR' \qquad (II)$$

where R is a $C_1$-$C_{12}$ hydrocarbyl group and R' is halogen, at least a portion of said organomagnesium composition being soluble in said liquid, the ratio of the number of moles of said organomagnesium composition to the number of moles of OH groups on said silica being from about 1.1 to about 3.5;

(ii) removing said liquid from step (i) to incorporate magnesium onto said carrier, said incorporated magnesium being selected from the group consisting of magnesium halide, unreacted organomagnesium composition and mixtures thereof, whereby a magnesium-containing carrier in the form of a dry, free-flowing powder is formed; and (iii) contacting said powder of step (ii) with a solution comprising a liquid medium, a brominating and/or chlorinating agent, and at least one titanium (IV) alkoxide compound, the number of moles of said titanium (IV) alkoxide compound being in excess of the stoichiometric amount thereof, said titanium (IV) alkoxide compound, said brominating and/or chlorinating agents being soluble in said liquid medium, and said magnesium-containing carrier being essentially insoluble in said liquid medium, whereby a compound of titanium which is insoluble in said liquid medium becomes incorporated onto said carrier.

DETAILED DESCRIPTION

Figure 1:
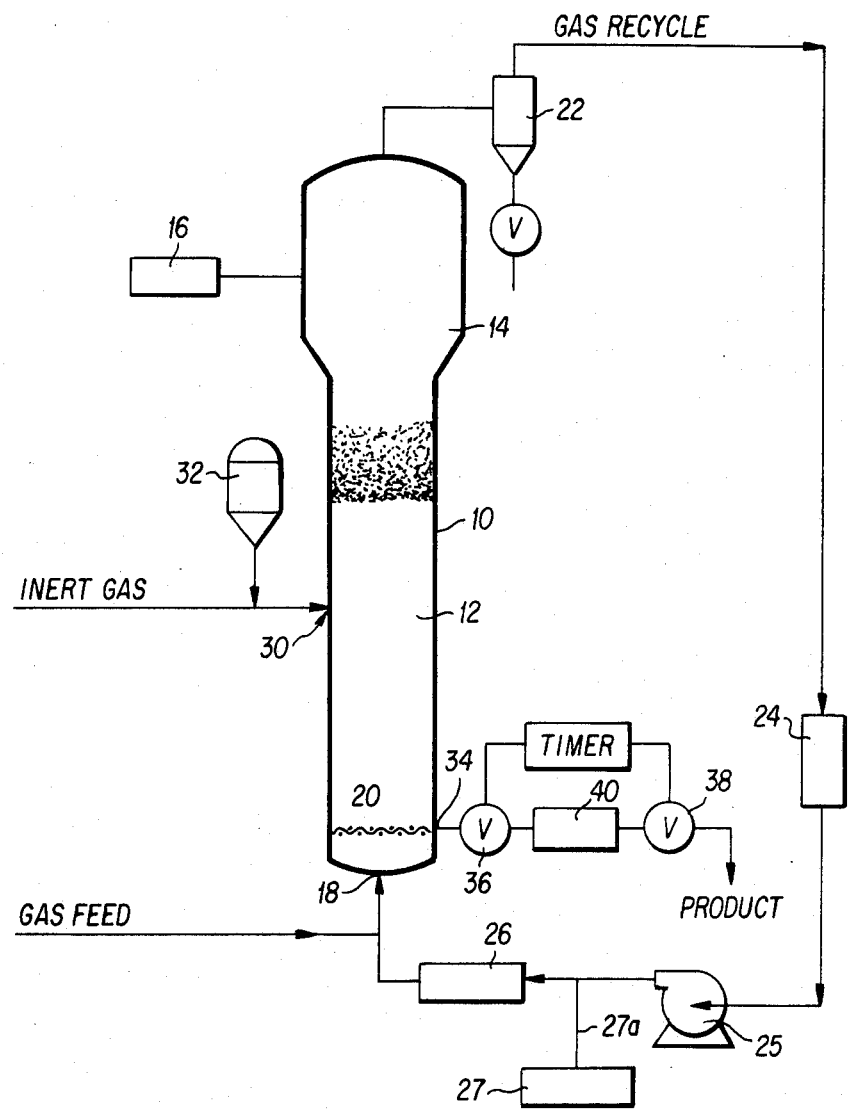
FIG. 1 is a diagrammatic illustration of a fluid bed process for producing polyethylene, such as linear low density polyethylene (LLDPE).

In accordance with one aspect of the present invention, at least one titanium compound is incorporated onto a suitable carrier (or support) by contacting the support with an organomagnesium compound and reacting the thus-obtained magnesium-containing support with a titanium (IV) alkoxide compound and a brominating and/or chlorinating agent, containing at least one alkyl group, in a liquid medium. Unreacted titanium is soluble in this liquid medium, while reacted titanium and the magnesium-containing support are insoluble in this liquid medium.

As used herein, the concept of incorporating a material onto a carrier is intended to connote the incorporation of the material (e.g., magnesium compositions and/or titanium compositions) onto the carrier by physical or chemical means. Accordingly, the incorporated material need not necessarily be chemically bound to the carrier.

Catalysts produced according to the present invention are described below in terms of the manner in which they are made. More particularly, these catalysts are described in terms of the manner in which a suitable carrier is treated in order to form such catalysts.

Suitable carrier materials which may be treated include solid, porous carrier materials, such as silica, alumina and combinations thereof, which contain reactive OH groups. Chemically bound water, e.g., as represented by the presence of the OH groups in the carrier, may be present when the carrier is contacted with water-reactive organomagnesium compounds in accordance with the present invention. A suitable carrier material is a material which, when it is contacted with a liquid containing the organomagnesium composition, contains water as represented by the hydroxyl (OH) groups in the amount of about 0.1 mmoles or more of OH groups per gram of carrier, preferably about 0.1 to about 2.0 mmoles of OH groups per gram of carrier, and most preferably about 0.3 to about 0.7 mmoles of OH groups per gram of carrier. Such carrier materials may be amorphous or crystalline in form.

Examples of suitable carrier materials are described in Graff, U.S. Pat. No. 4,173,547, the entire contents of which are incorporated herein by reference. Of particular interest is the passage extending from column 3, line 62 to column 5, line 44 of this Graff patent. Internal porosity of carriers can be determined by a technique termed BET-technique, described by S. Brunauer, P. Emmett and E. Teller in *Journal of the American Chemical Society*, 60, pp. 209-319 (1938). Specific surface areas of carriers can also be measured in accordance with the aforementioned BET-technique, with the use of the standardized method, as described in *British Standards* BS 4359, Volume 1, (1969).

Further examples of suitable carrier materials are given in Stevens et al., U.S. Pat. No. 3,718,636, the entire contents of which are incorporated herein by reference. Of particular interest is the passage extending from line 12 to line 29 of column 3 of this Stevens et al patent. Polymeric silicas known as polysiloxanes can also be used as suitable carrier materials.

These carrier materials may be in the form of particles having a particle size of from about 0.1 micron to about 200 microns, more preferably from about 10 to about 150 microns. Preferably, the carrier is in the form of spherical particles, e.g., spray dried silica. The internal porosity of these carriers is larger than 0.2 cm$^3$/gr, preferably larger than about 0.6 cm$^3$/gr. The specific surface area of these carriers is larger than about 50 m$^2$/gr, preferably from about 150 to about 1500 m$^2$/gr. In the most preferred embodiment, the carrier is silica which has been dehydrated by fluidizing with nitrogen and heating at about 800° C. for about 16 hours to achieve a surface hydroxyl group concentration of about 0.5 mmols/gr. The silica is a high surface area, amorphous silica (surface area=300 m$^2$/gr; pore volume of 1.65 cm$^3$ per gram), and it is a material marketed under the tradename of Davison 952 by the Davison Chemical Division of W. R. Grace and Company. The silica is in the form of spherical particles, e.g., as obtained by a spray-drying process.

It is desirable to remove physically bound water from the carrier material prior to contacting this material with water-reactive magnesium compounds. This water removal may be accomplished by heating the carrier material to a temperature of from about 100° C. to an upper limit of temperature represented by the temperature at which change of state or sintering occurs. A suitable range of temperatures is, from about 100° C. to about 1000° C., preferably from about 150° C. to about 850° C., yet more preferably from about 750° C. to about 850° C. and most preferably about 800° C.

Excess OH groups present in the carrier may be removed by heating the carrier, prior to the contacting step, for a sufficient time at a sufficient temperature to accomplish the desired degree of the OH groups removal. For example, a relatively small number of OH groups may be removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of hydroxyl groups in silica may be determined according to the method disclosed by J. B. Peri and A. L. Hensley, Jr., in *J. Phys. Chem.*, 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A suitable dehydrated carrier material is treated with a solution of a solid organomagnesium composition in a liquid, the organomagnesium composition being capable of reacting with the titanium alkoxide compound. The organomagnesium composition has the formula $R_n MgR'_{(2-n)}$, where R and R' are the same or different and they are $C_1$-$C_{12}$ hydrocarbyl groups, preferably $C_1$-$C_4$ alkane groups, and yet more preferably $C_2$-$C_4$ alkane groups, provided that R' may also be halogen, preferably bromine or chlorine, and most preferably chlorine, and n is 0, 1 or 2. In the preferred embodiment, a solution of such an organomagnesium composition is a Grignard reagent and the carrier material is contacted with the solution thereof in the absence of ball milling.

Grignard reagents are described in *Organic Chemistry*, Second Edition, Morrison and Boyd, fifth printing, May 1968, pp. 112-114 and 516-521, the entire contents of which are incorporated herein by reference. Grignard reagents are known to react with organic molecules or moieties which have hydrogen bonded directly to a nitrogen or oxygen atom. Furthermore, Grignard reagents are also known to react with organic molecules or moieties containing carbonyl groups, cyano groups and nitro groups. Accordingly, the groups defined by R in the above-mentioned formula generally should not be any of the above-mentioned groups indicated as being reactive with Grignard reagents. Examples of R and R' include $C_1$-$C_{12}$ hydrocarbyl groups (e.g., $C_1$-$C_{12}$ alkyl or $C_6$-$C_{12}$ aryl) or $C_1$-$C_{12}$ alkoxy groups, which may be unsubstituted or substituted, e.g., with one or more halogens (e.g., F, Cl, Br or I), or with $C_1$-$C_{12}$ alkoxy groups. In the most preferred embodiment, ethylmagnesium chloride is the compound represented by the formula $R_n MgR'_{(2-n)}$.

It is noted that even a Grignard reagent of ethylmagnesium chloride may contain a mixture of molecules other than ethylmagnesium chloride, per se. For example, particularly under the influence of various liquids or solvent systems, ethylmagnesium chloride may disproportionate to form essentially a mixture of magnesium dichloride and diethylmagnesium. Such mixtures are intended to be encompassed within the formula $R_n MgR'_{(2-n)}$. Accordingly, it will be understood that compositions of the formula $R_n MgR'_{(2-n)}$ and compositions representative thereof are intended herein to represent the overall empirical formula of these compositions rather than to set forth the molecular formula of these compositions.

Preferably, the carrier is treated with the aforementioned solution in such a manner that, after the treatment is completed, the carrier has magnesium incorporated onto it. A preferred means of accomplishing this result is by adding a porous carrier to a liquid containing a dissolved organomagnesium composition of the formula $R_n MgR'_{(2-n)}$ and maintaining it in the suspension for about 0.1 to about 10, preferably about 0.5 to about 5, and most preferably for about 1.0 to about 2.0 hours (hrs) at a temperature of about 25 to about 200, preferably about 50 to about 100, and most preferably about 60° to about 80° C. As a result of this treatment, magnesium becomes incorporated into the pores of the carrier by: (1) a chemical reaction of the organomagnesium composition with the carrier, by (2) a precipitation of magnesium from the organomagnesium composition onto the carrier or by (3) a combination of such reaction and precipitation.

Organomagnesium compositions corresponding to those found in Grignard reagents have the formula RMgX, where R is as defined hereinabove and X is halogen (e.g., Cl, Br or I), and they are soluble in ethers. Suitable ethers are known in the art, e.g., see Yamaguchi et al, U.S. Pat. No. 3,989,881, column 4, lines 32–49, the entire contents of this patent being incorporated herein by reference, and include aliphatic ethers, such as diethyl ether, diisopropyl ether, dibutyl ether, dipentyl ether and ethyl-n-butyl ether; and cyclic ethers, such as tetrahydrofuran and dioxane. Without wishing to be bound by any theory of operability, it is theorized that the reason for the ability of such ethers (e.g., diethyl ether) to solubilize such organomagnesium compositions (e.g., $C_2H_5MgCl$) is by virtue of the ability of the magnesium atom to act as a Lewis acid and to associate with at least one electron pair from the etheric oxygen which acts as a Lewis base. Such an association is represented as follows:

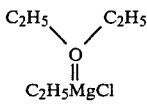

Thus, the liquid medium containing the organomagnesium composition is usually an ether, preferably tetrahydrofuran. Although organomagnesium compounds of the formula RMgX tend to be insoluble in non-Lewis base solvents, such as hexane, these organomagnesium compounds may be completely soluble in mixed solvent systems such as hexane/tetrahydrofuran, provided that a sufficient solubilizing amount of the Lewis base solvent is present. Thus, according to one aspect of the present invention, a carrier may be slurried in a non-Lewis base co-solvent and an organomagnesium compound may be added thereto in the form of an ether solution thereof. Suitable non-Lewis base so-solvents are also known in the art, see e.g., Graff U.S. Pat. No. 4,173,547, column 6, line 61 to column 7, line 8. These co-solvents include straight or branched saturated aliphatic hydrocarbons, such as butanes, pentanes, hexanes, heptanes, or commonly available mixtures thereof, generally known as gasoline, kerosene, gas, oil or other petroleum fractions. Further, such co-solvents include cyclic hydrocarbons, such as cyclopentane, cyclohexane, methylcyclohexane, as well as aromatic hydrocarbons, such as benzene or halogen-aromatic hydrocarbons, such as chlorobenzene. It is noted that such co-solvents should preferably not contain groups which are reactive with the organomagnesium composition. A preferred co-solvent is n-hexane.

The amounts and concentrations of the organomagnesium/ether solution which is added to the co-solvent/carrier slurry are preferably sufficient to assure that the organomagnesium composition is at least partially soluble in the co-solvent/solvent system. Thus, this amount is dependent upon many factors, such as the composition of solvents and organomagnesium and the temperature of the co-solvent/solvent system. However, it will be readily understood that the selection of proper amounts and concentrations of organomagnesium/ether solutions is well within the ability of those of ordinary skill in the art. For example, when an ethylmagnesium chloride/tetrahydrofuran solution is added to a hexane/carrier slurry, the concentration of the ethylmagnesium choride/tetrahydrofuran solution may be from about 0.1 to about 10 Molar, preferably from about 1 to about 3 Molar.

For example, when 107 g of silicic acid are suspended in 500 ml of n-heptane and 342 ml of a solution of 172 mmols of n-propyl magnesium chloride in diethyl ether are added thereto in accordance with Example 1 of Strobel et al, U.S. Pat. No. 4,148,754, the n-propyl magnesium chloride may well be totally soluble in the n-heptane/diethyl ether mixture. However, when 15 g of silica are slurried in 200 ml of n-hexane and 50 ml of a 2.0 molar solution of ethylmagnesium chloride in tetrahydrofuran is added thereto, the ethylmagnesium chloride appears to be only partially soluble in the n-hexane/tetrahydrofuran mixture.

A carrier material may also be incorporated with an organomagnesium composition by suitably contacting the carrier material with a liquid containing an organomagnesium composition of the formula $R_nMgR'_{(2-n)}$ in a partially dissolved state. More particularly, the carrier material may be slurried in one of the above-exemplified non-Lewis base co-solvents, such as hexane, and a solution of an organomagnesium composition in a liquid, such as ether may be added thereto, the amount of the liquid relative to the amount of co-solvent being sufficient to only partially solubilize the organomagnesium composition. The non-soluble portion of the organomagnesium composition may be in the form of a halomagnesium, e.g., dihalomagnesium, the amount of this non-soluble halomagnesium being essentially equivalent to an amount of dialkylmagnesium remaining soluble in the solvent/co-solvent mixture.

It is noted that if the organomagnesium compound is only sparingly soluble, e.g., to the extent of about 1 percent or less, reactive organomagnesium composition which is consumed by reactive sites on the carrier will be replaced by further dissolution of undissolved organomagnesium composition by a mass action effect.

Another example of a method of incorporating a magnesium composition onto a carrier material is to slurry the carrier material in a Lewis base solvent, such as an ether, and to add a solution of organomagnesium composition in ether to this slurry. The addition of organomagnesium/ether solution to ether or co-solvent/carrier slurry may take place as a gradual continuous dropwise addition while the liquid medium of the slurry is maintained under reflux conditions. Without wishing to be bound by any operability theory, it is thought that, upon such addition, dissolved organomagnesium composition may react with the carrier at the site of reactive OH groups, if any, appearing on the available surface area of the carrier. Such a reaction may be described with respect to ethylmagnesium chloride as follows:

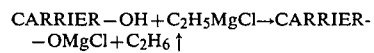

Accordingly, it may be possible to incorporate a magnesium composition onto a carrier by reacting an organomagnesium composition with reactive OH groups of the carrier.

Another means of incorporating a magnesium composition onto a carrier is to precipitate a magnesium compound or compounds from an organomagnesium composition from a liquid solvent onto a carrier. This precipitation may take place by any possible convenient means, including cooling of the liquid solvent, using a sufficiently large amount of non-solvent in the initial slurry, adding non-solvent to the slurry or stripping off solvent. For example, in the case of a carrier slurry where the liquid medium is essentially a hexane/tetrahydrofuran solution of ethylmagnesium chloride, it is preferred to precipitate ethylmagnesium chloride onto the carrier by distillation of the solvent. In this regard, it is noted that tetrahydrofuran and hexane have nearly equivalent boiling points. Thus, it would be expected that during the course of distilling these solvents, the ratio of tetrahydrofuran to hexane in the liquid state would remain essentially constant. On the other hand, if the boiling point of the co-solvent is significantly greater than the boiling point of the ether, then the relative concentration of the co-solvent may increase appreciably as the distillation proceeds. In such a case, a non-uniform precipitation of magnesium may occur, such that any magnesium halide, e.g., magnesium dihalide which may be present, tends to precipitate before organomagnesium is precipitated.

In view of the above discussion, it will be understood that at least three possible types of magnesium-containing compound or compounds on the carrier can be obtained. The first type is essentially one or more reaction product of an organomagnesium composition with a carrier having OH functionalities which are reactive with this organomagnesium composition. This product contains essentially no precipitated magnesium compounds. Examples of such reaction products are given in the aforementioned Stevens et al U.S. Pat. No. 3,787,384 and Strobel et al U.S. Pat. No. 4,148,754.

A second type of product is essentially one or more magnesium compound which is incorporated onto the carrier by means other than those specified above, i.e., it is not a reaction product of an organomagnesium composition with a carrier having reactive OH functionalities. This product contains essentially no reaction product of organomagnesium composition with the carrier. Such product is obtained when an organomagnesium composition is precipitated onto a carrier having essentially no OH functionalities reactive with the organomagnesium composition.

A third type of product contains both, one or more reaction product of an organomagnesium composition with the carrier and one or more precipitated organomagnesium composition. Such a product is obtained when an excess of organomagnesium composition, with respect to the OH functionalities, is reacted with a carrier containing such reactive OH functionalities.

Accordingly, magnesium-containing compound may be incorporated onto a carrier in either an unreacted form or in a reacted form, or a combination of both forms. Without wishing to be bound by any theory of operability, it is believed that the reactive form of the magnesium-containing compound is obtained by the reaction of reactive hydroxyl groups of the carrier with an organomagnesium composition. However, regardless of the possible mechanism of incorporating the magnesium-containing compound onto the carrier, it is important for the purposes of the present invention that the number of moles of the organomagnesium composition in the solution used to contact the carrier be in excess of the number of moles of OH groups on the carrier, so that the molar ratio of the organomagnesium composition in the solution to the hydroxyl groups is greater than 1.0, preferably it is from about 1.1 to about 3.5 and most preferably from about 2.0 to about 3.5. It is also important for the purposes of the present invention, that the number of moles of the sum of all magnesium-containing compounds on the carrier, in the product of the second step of the synthesis of the catalyst of this invention, be in excess of the number of moles of OH groups originally present on the carrier, prior to the contact of the carrier with the liquid containing the organomagnesium composition. The molar ratio of the sum of all magnesium-containing compounds in the product of the second step to the aforementioned OH groups is greater than 1 preferably it is from about 1.1 to about 3.5 and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixture of the impregnated carrier and the solvents, evaporation, decantation or centrifugation. Evaporation at about the boiling point of the liquid is the most preferred method of liquid removal. It is also important that the product of the second reaction step is not washed so that the excess of the magnesium-containing compound or compounds which did not react with the hydroxyl (OH) groups of the carrier is retained on the carrier. After the liquid is removed, the resulting product is dried by any conventional means, e.g., drying at ambient temperature or at 50° to 80° C. for about 12 to 16 hours, in a stream of dry nitrogen to produce a free-flowing powder which contains the aforementioned amounts of magnesium-containing compounds with respect to the OH groups, i.e., the molar ratio of the sum of all magnesium-containing compounds to the OH groups is greater than 1, preferably it is about 1.1 to about 3.5 and most preferably about 2.0 to about 3.5.

Whether magnesium is in the form of a reaction product with the carrier or in the form of a non-reacted precipitate, it is noted that the magnesium-containing compound(s) may, optionally, be in the form of a complex with one or more electron donating agents (i.e., Lewis bases). For example, when ethylmagnesium chloride is precipitated from a hexane/tetrahydrofuran solution, each mole of the ethylmagnesium chloride precipitated may be complexed with approximately one mole of tetrahydrofuran. In more general terms, when an organomagnesium composition is precipitated from a solution containing an ether, the resulting precipitate may have molecules of this ether complexed with molecules of the organomagnesium composition.

The amount of magnesium-containing compound(s) which is incorporated onto the carrier should be sufficient to react with titanium (IV) alkoxide in order to incorporate a catalytically effective amount of titanium on the carrier in the manner set forth hereinbelow. Thus, the carrier should comprise from about 0.1 to about 50, preferably about 0.1 to about 5 milimoles (mmoles) of magnesium per gram of carrier (after the treatment of the carrier with the organomagnesium composition is completed). When a liquid containing an organomagnesium composition is contacted with a carrier, the amount of magnesium in this liquid in terms of mmoles may be essentially the same as that stated above with respect to that which is incorporated onto the carrier.

When a non-Lewis base co-solvent is used to slurry the carrier, an amount of such co-solvent sufficient to slurry such a carrier is used. More particularly, from about 2 to about 100 mililiters (mls), preferably from about 5 to about 15 mls, of such co-solvent may be present per gram of carrier.

While the above-exemplified methods of incorporating a solid reactive magnesium composition onto a carrier are preferred, it will be understood that alternative methods are available. For instance, it is possible to precipitate a dialkylmagnesium composition onto a carrier from a hydrocarbyl or halohydrocarbyl solvent containing essentially no ether. It is also possible to combine a carrier and a solid organomagnesium composition in the absence of a solvent by means of a ball milling device. However, such a ball milling process is less preferred, particularly because it does not tend to effectively incorporate a reactive magnesium compound into the pores of the carrier.

Mechanical shearing means, such as ball milling, are not necessary to achieve the desired impregnation of catalyst onto carrier in accordance with the present invention. Accordingly, a ball milling process, such as that described in Examples 2–5 of Grant, U.S. Pat. No. 3,821,186, is unecessary and may be avoided. Moreover, a ball milling process may tend to disrupt the particle size and morphology of the carrier. Since catalysts made in accordance with the present invention are preferably capable of being used in gas phase, fluid bed polymerization processes, e.g., as described by Karol et al, U.S. Pat. No. 4,302,566, the particle size and morphology of the catalyst may be critical. Accordingly, another reason for avoiding ball milling is to preserve the particle size and morphology of the carrier while it is being treated in accordance with the process of the present invention.

The free-flowing powder obtained in the second step is then reacted with a solution comprising a liquid medium, titanium (IV) alkoxide and a brominating and/or chlorinating agent. The titanium (IV) alkoxide and the brominating and/or chlorinating agents are soluble in this liquid reaction medium, while the treated carrier (i.e., the free-flowing powder), including the magnesium-containing compound(s), is insoluble in this liquid reaction medium. Thus, the reaction which takes place between the tetravalent titanium, of the titanium (IV) alkoxide, the brominating and/or chlorinating agent, and the reactive magnesium-containing compound(s) is a reaction of a solid with at least two liquids. It is further noted that the reacted titanium is insoluble in the liquid reaction medium.

Without wishing to be bound by any theory of operability, it is thought that the reaction which takes place between a magnesium compound, which is not a reaction product of an organomagnesium composition with a carrier, and the tetravalent titanium of the titanium (IV) alkoxide in the liquid reaction medium is essentially an oxidation/reduction reaction, wherein the excess magnesium compound acts as a reducing agent for the tetravalent titanium. On the other hand, while not wishing to be bound by any particular theory or chemical mechanism, the reaction which takes place between (1) tetravalent titanium and (2) the reaction product of the organomagnesium composition and the carrier containing reactive OH groups is not an oxidation/reduction reaction. However, it is noted that both of the above-mentioned reactions lead to the incorporation of titanium onto a support comprising the treated carrier.

Titanium (IV) alkoxides which are used in the liquid reaction medium have the formula Ti(OR″)$_m$, wherein R″ is a branched or unbranched alkyl radical of 1 to about 20 carbon atoms, preferably 1 to about 6 carbon atoms, and most preferably 3 carbon atoms, and m is 4. Examples of suitable titanium compounds are

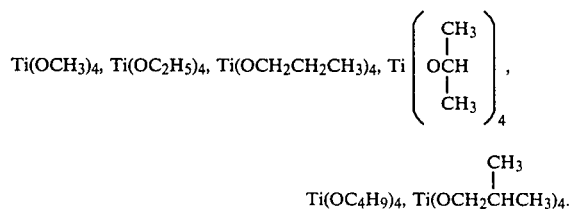

$$\text{Ti(OC}_4\text{H}_9)_4, \text{Ti(OCH}_2\overset{\overset{\displaystyle \text{CH}_3}{|}}{\text{CH}}\text{CH}_3)_4.$$

The most preferred titanium (IV) alkoxide compound used in the process of this invention is titanium (IV) tetraisopropoxide, of the formula

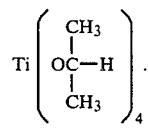

The brominating and/or chlorinating agent used in the synthesis has the formula

wherein R‴ is a $C_1$–$C_{12}$ branched or unbranched alkyl group, preferably $C_1$–$C_4$ branched or unbranched alkyl group, A is Group IIIB, IVB, or IVA element (as defined in the Periodic Chart of the Elements, Published by the Fisher Scientific Company, Catalog Number 5-702-10), preferably silicon (Si) titanium (Ti), or aluminum (Al), 1 is valence of element A, X is bromine (Br) or chlorine (Cl), preferably chlorine, and p is 0, 1, 2, 3 or 4. Examples of suitable brominating or chlorinating agents are CH$_3$TiCl$_3$, TiCl$_4$, CH$_3$SiCl$_3$, (CH$_3$)$_2$SiCl$_2$, CH$_3$SiBr$_3$, (CH$_3$)$_2$SiBr$_2$, CH$_3$AlCl$_2$, (CH$_3$)$_2$AlCl, C$_2$H$_5$AlCl$_2$, C$_2$H$_5$AlBr$_2$, (C$_2$H$_5$)$_2$AlBr, n-C$_3$H$_7$AlCl$_2$, (C$_2$H$_5$)$_2$AlCl, (n-C$_3$H$_7$)$_2$AlCl, (i-C$_3$H$_7$)$_2$AlCl, i-C$_3$H$_7$AlCl$_2$, (n-C$_4$H$_9$)$_2$AlCl and n-C$_4$H$_9$AlCl$_2$. The most preferred chlorinating agent is ethylaluminum dichloride of the formula C$_2$H$_5$AlCl$_2$. The brominating or chlorinating agent is in the form of a solution in an inert hydrocarbon diluent. The diluent has preferably the same chemical composition as the liquid reaction medium in which the organomagnesium composition-containing carrier is reacted with the titanium (IV) alkoxide and the brominating and/or chlorinating agent.

Suitable diluents include those materials in which the titanium (IV) alkoxide and the brominating and chlorinating agents are at least partially soluble and which are liquid at reaction temperatures. Preferred diluents are alkanes, such as hexane, heptane, octane, nonane, and decane, although a variety of other materials including cycloalkanes, such as cyclohexane, aromatics, such as benzene, and ethylbenzene, and halogenated and hydrogenated aromatics, such as chlorobenzene and orthodichlorobenzene also can be employed. The most preferred diluent is hexane. Prior to use, the diluent should be purified, such as by percolation through silica gel and/or molecular sieves, and other necessary columns, to remove traces of water, oxygen, polar compounds, and other materials capable of adversely affecting catalyst activity. The magnesium-containing dry, free flowing powder is reacted with a titanium (IV) alkoxide and the brominating and/or chlorinating agent at a temperature and for a time sufficient to yield a solid catalyst component. Temperatures at which this reaction is conducted range from about −40° to about 250° C., preferably, from about 0° to about 170° C., and most preferably, from about 25° to about 60° C. temperature. Suitable reaction times range from about ½ to about 25 hours, with about 1-½ to about 6 hours being preferred.

In reacting the magnesium-containing carrier material with the titanium (IV) alkoxide and the brominating and/or chlorinating agent, the latter is employed in an amount which is effective to at least partially brominate or chlorinate, respectively, the titanium present in the reaction mixture. This amount varies, depending upon the bromine or chlorine content of the brominating or chlorinating agent and the titanium (IV) alkoxide component employed. Generally, however, the molar ratio of the chlorinating or brominating agent to the titanium (IV) alkoxide is about 1 to about 30, preferably, from about 2 to about 15, and most preferably, from about 2 to about 8. It is noted that mixtures of chlorinating or brominating agents can also be used in accordance with the present invention. When such mixtures are used, the molar ratio of the sum of the chlorinating and brominating agents to the titanium (IV) alkoxide is about 1 to about 30, preferably about 2 to about 15, and most preferably about 2 to about 8.

After the reaction is completed, the slurry, formed by the reaction mixture, is filtered, washed with a suitable washing agent, e.g., an alkane, such as hexane, and dried in an inert atmosphere, e.g., nitrogen.

The reaction of the titanium (IV) alkoxide compound and the chlorinating and/or brominating agent in the liquid medium conveniently takes place by slurrying the solid carrier in a solution of the titanium (IV) alkoxide and chlorinating and/or brominating agent in the diluent compound and heating the liquid reaction medium to a suitable reaction temperature, e.g., to the reflux temperature of the solvent at standard atmospheric pressure. Thus, the reaction may take place under reflux conditions.

The various reaction parameters can be widely varied, suitable selection of such parameters being well within the skill of those having ordinary skill in the art. For example, the volume of titanium (IV) alkoxide to magnesium-containing carrier initially slurried in the solution may be from about 0.1 to about 10 mililiters (mls) per gram of such carrier. The concentration of the titanium (IV) alkoxide solution may be, for example, from about 0.1 to about 5 Molar. It is important, however, that the molar amount of the tetravalent titanium metal in the solution is in excess of the molar amount of the organomagnesium composition used to treat the carrier in the first step of the catalyst synthesis. Thus, the molar ratio of the tetravalent titanium to the organomagnesium composition is from about 1 to about 10, preferably from about 3 to about 6. Unreacted titanium may be removed by any suitable separation techniques, such as decantation, filtration and washing.

As indicated above, the catalysts of the present invention are prepared in the substantial absence of water, oxygen, and other catalyst poisons. Conveniently, such materials are excluded by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any diluent employed in the second and third preparative steps in the manner described above also is helpful in this regard.

It may also be possible to replace some or all of the above-mentioned tetravalent titanium compounds with one or more other transition metal compounds. Such other transition metal compounds are exemplified in the passage extending from line 55 to line 60 of column 6 of Graff et al, U.S. Pat. No. 4,173,547. Preferred transition metal compounds include zirconium compounds (e.g., $ZrCl_4$) and, especially, vanadium compounds (e.g., $VCl_4$).

The thus-formed supported catalyst may be activated with suitable activators. The activators are known in the art and they include any of the materials commonly employed as promoters for olefin polymerization catalyst components containing compounds of the Group IVA, VA or VIA metals (as defined in the Periodic Chart of the Elements, published by Fisher Scientific Company, Catalog Number 5-702-10). Examples of the promoters include Group IB, IIA, IIB, IIIB and IVB metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are the Group IIIB metal alkyls and dialkylhalides and trialkylhalides having 1 to about 20 carbon atoms per alkyl radical. More preferably, the promoter is a trialkylaluminum compound having 1 to about 6 carbon atoms per alkyl radical.

The organometallic promoter is employed in an amount which is at least effective to promote the polymerization activity of the solid component of the catalyst of this invention. Preferably, at least about three parts by weight of promoter are employed per part, by weight, of solid catalyst component, although higher ratios, such as 10:1, 25:1, 100:1 or higher also are suitable and often give highly beneficial results. In slurry polymerization processes, a portion of the promoter can be employed to pretreat the polymerization medium if desired. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59, the entire contents of both patents being incorporated herein by reference. The most preferred activator is triethylaluminum.

The catalyst may be activated in situ by adding the activator and catalyst separately to the polymerization medium. It is also possible to combine the catalyst and activator before introduction thereof into the polymerization medium, e.g., for up to about 2 hours at a temperature of from about −40° to about 80° C.

A suitable activating amount of the activator may be used to promote the polymerization activity of the catalyst. The number of moles of activator per gram atom of titanium in the catalyst is, e.g., from about 1 to about 100 and is preferably greater than about 5.

Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive melt index of the polymer produced.

The molecular weight distribution of the polymers prepared in the presence of the catalysts of the present invention is conveniently controlled by adjusting the amount of the brominating and/or chlorinating agent with respect to the amount of titanium (IV) alkoxide used in the catalyst synthesis. As will be discussed in detail below, low brominating or chlorinating agent-/titanium ratios (about 2/1) produce polymers having low melt flow ratio (MFR) values (about 25 to about 35), while higher brominating and/or chlorinating-/titanium ratios (about 8/1) produce polymers of higher MFR values (about 50 to about 65). As is known to those skilled in the art, higher MFR values are indicative of a relatively broad molecular weight distribution of the polymer. As used herein, MFR is defined as the ratio of Flow Index or High Load Melt Index, $I_{21}$, to Melt Index, $I_2$.

The catalysts prepared according to the present invention are highly active and may have an activity of at least about 1500 grams of polymer per gram of catalyst per 100 psi of ethylene pressure to about 6000 grams of polymer per gram of catalyst per 100 psi of ethylene pressure over about three hours of polymerization.

The catalysts prepared according to the present invention may be useful for the production of linear low density polyethylene polymers. Such linear low density polyethylene polymers may have a density of about 0.918 to about 0.940 g/cc.

Advantageous properties of linear low density polyethylene polymers are described by Anderson et al, in U.S. Pat. No. 4,076,698. The linear low density polyethylene polymers prepared in accordance with the present invention may be polymers of ethylene alone or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating same is described by Levine et al, U.S. Pat. No. 4,011,382 and Karol et al, U.S. Pat. No. 4,302,566, the entire contents of both of which are incorporated herein by reference.

A preferred process for conducting a gas phase, fluid bed polymerization is described below.

The polymerization reaction is conducted by contacting a stream of the monomers, in a gas phase process, such as in the fluid bed process described below, and substantially in the absence of catalyst poisons, such as moisture, oxygen, CO, $CO_2$, and acetylene with a catalytically effective amount of the completely activated catalyst at a temperature and at a pressure sufficient to initiate the polymerization reaction.

In a preferred embodiment, in order to achieve the desired density ranges in the copolymers, it is necessary to copolymerize a sufficient amount of the comonomers having three or more carbon atoms with ethylene to achieve a level of >0 to 10 mol percent of the $C_3$ to $C_8$ comonomer in the copolymer. The amount of comonomer needed to achieve this result depends on the particular comonomer(s) employed.

A fluidized bed reaction system which can be used in the practice of the process of the present invention is illustrated in FIG. 1. With reference thereto, a reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. The term $G_{mf}$ is used herein in the accepted form as the abbreviation for the minimum mass gas flow required to achieve fluidization, see C. Y. Wen and Y. H. Yu, "Mechanics of Fluidization", *Chemical Engineering Progress Symposium Series*, Vol. 62, p. 100–111 (1966).

It is essential that the bed always contains particles, such as polymer particles, to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When they are different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically on the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. A gas distribution plate 20 is positioned above the point of return to aid fluidization of the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, or any similar plate known in the art. The elements of the plate may all be stationary, or the plate may be of the mobile type disclosed in U.S. Pat. No. 3,298,792, the contents of which are incorporated herein by reference. Whatever the design of the plate, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed varies between about 0 to about 2.0 moles of hydrogen per mole of ethylene in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 through line 27A.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare polymer products having a density of about 0.91 to 0.92 gms/cc, and temperatures of about 80° to 100° C. are used to prepare products having a density of about 0.92 to 0.94 gms/cc, and temperatures of about 90° to 115° C. are used to prepare products having a density of about 0.94 to 0.96 gms/cc.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30 which is above the distribution plate 20. Injecting the catalyst at a point above the distribution plate is an important feature of this process. Since the catalysts used in the practice of this invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst, such as nitrogen or argon, is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in the rate of heat generation. This insures the maintenance of an essentially constant temperature in the bed. It will be apparent to those skilled in the art that complete instrumentation of both the fluidized bed and the recycle gas cooling system is necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention yields a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The term vigin resin or polymer as used herein means polymer, in granular form, as it is recovered from the polymerization reactor.

Films having good tear strength properties may be formed from the ethylene/hexene copolymers, produced in the fluidized bed process in the presence of the catalyst of this invention, by a variety of techniques. For example, desirable blown films as well as slot cast films may be formed.

Blown films formed from ethylene/hexene copolymers having a density of about 0.918 g/cc or greater may have especially desirable properties for bag structures. For example, such blown films may be fabricated into trash bag structures which, when loaded to capacity, resist breaking when dropped from a height of about four feet. A particular example of a blown film formed from an ethylene/hexene copolymer prepared in Example 32, discussed below, having a density of 0.932 gr/cc and a melt index of 1.15 gr/10 min (determined by the procedure of ASTM D-1238, condition E), which is formed in a laboratory scale, slurry reactor is a blown film having a thickness of 1.5 mil, a spencer impact strength of at least 580 gr, an MD Elmendorf tear strength of at least 225 gr, and a TD Elmendorf tear strength of at least 580 gr.

The following Examples further illustrate the essential features of the invention. However, it will be apparent to those skilled in the art that the specific reactants and reaction conditions used in the Examples do not limit the scope of the invention.

EXAMPLE 1

All procedures were carried out in glass or quartz equipment under purified nitrogen using predried nitrogen-purged solvents.

Catalyst Preparation

First Step 65.1 grams of Davison silica gel, Grade 952 (a trademark of and available from the Davison Chemical Division, W. R. Grace and Company, Baltimore, MD) previously heated to 800° C. for twelve hours under dry nitrogen, cooled to ambient temperature, was placed into a one-liter round bottom flask containing 375 ml of dry hexane. The silica/hexane slurry was heated to reflux and 25.0 ml of ethylmagnesium chloride (1.94 molar in tetrahydrofuran, THF) was added dropwise to the refluxing solution. The reflux was continued for one hour, then the solvents were removed by distillation to give 73.4 grams of a dry free-flowing powder. The free-flowing powder contained 0.70 mmols/gm. of magnesium (Mg), which compared favorably with the theoretical calculated amount of 0.66 mmols/gm. of Mg.

Second Step

Into a 500 ml flask were placed in the following order; 180 mls of dry hexane, 50 mls of a 25 wt % solution of ethylaluminum dichloride in hexane, 10 mls of titanium (IV) isopropoxide and 10.28 grams of the product from the first step. The slurry was stirred overnight at room temperature, transferred to a filtering apparatus, filtered, washed 10 times with 50 ml aliquots of dry hexane and dried with a stream of dry nitrogen. Yield: 11.6 grams of solid product, which analyzed as follows: Mg-0.58 mmols/gram; Ti-0.832 mmols/gm; Al-0.408 mmols/gm; Cl-2.71 mmols/gram. The mole ratio of ethylaluminum dichloride (EADC) to titanium tetraisopropoxide (TTP) used in the synthesis was 1.9.

EXAMPLES 2-9

Additional catalysts were prepared in accordance with the procedure of Example 1, except that the EADC/TTP mole ratio was varied from 1.0 to 7.7. The amounts of key ingredients used in catalyst preparation, the yield of free-flowing powder obtained from the first step and the yield of the catalysts for respective examples are summarized in Table I, below.

TABLE I

SUMMARY OF CATALYST PREPARATION CONDITIONS

| Catalyst of Example | Amount From First Step (Grams) | Magnesium (mmols) | EADC (mmols)[1] | TTP (mmols)[2] | Mole Ratio EADC/TTP | Catalyst Yield (Grams) |
|---|---|---|---|---|---|---|
| 1 | 10.3 | 7.2 | 65 | 33.6 | 1.9 | 11.6 |
| 2 | 1.7 | 1.3 | 13 | 6.7 | 1.9 | 2.6 |
| 3 | 10.1 | 7.1 | 32.5 | 33.6 | 1.0 | |
| 4 | 10.0 | 6.8 | 96 | 33.6 | 2.9 | |
| 5 | 10.1 | 7.1 | 130 | 33.6 | 3.9 | 16.1 |
| 6 | 10.1 | 6.8 | 130 | 33.6 | 3.9 | |
| 7 | 10.0 | 6.8 | 195 | 33.6 | 5.8 | |
| 8 | 10.0 | 7.8 | 130 | 18.5 | 7.0 | 12.7 |
| 9 | 10.1 | 7.1 | 260 | 33.6 | 7.7 | 14.6 |

[1]EADC = Ethylaluminum Dichloride
[2]TTP = Titanium Tetraisopropoxide

COMPARATIVE EXAMPLE A

Several catalysts, prepared substantially in accordance with the teachings of Karol et al, U.S. Pat. No. 4,302,566, were used in comparative testing as discussed in Examples given hereinafter. These catalysts are referred to herein as "comparative A" catalysts or simply as "A" catalysts.

These catalysts are substantially equivalent to those prepared by the following representative procedure.

In a 5 liter flask equipped with a mechanical stirrer, 16.0 g (0.168 Mol) of anhydrous $MgCl_2$ is mixed with 850 ml of pure tetrahydrofuran under nitrogen. The mixture is stirred at room temperature (about 25° C.) while 13.05 g (0.069 Mol) of $TiCl_4$ is added dropwise. After complete addition, the contents of the flask are heated to reflux for about one-half to one hour to dissolve the solids. The system is cooled to room temperature and 3 liters of pure n-hexane are slowly added over a period of one-half hour. A yellow solid precipitates. The supernatant fluid is decanted and the solids are washed three times, with one liter of n-hexane each time. The solids are filtered and dried in a rotating evaporating flask at 40°–60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they are first added to the electron donor compound and that all other residual weight in the precursor composition is due to the electron donor compound.

Analysis of the solid would typically show the following percent by weight: Mg-6.1 percent, Ti-4.9 percent; which corresponds to $TiMg_{2.45}Cl_{8.9}(THF)_{7.0}$. (THF means tetrahydrofuran.) This precursor composition, which constitutes the catalytic portion of the comparative A catalyst, is supported on an inert silica carrier and is activated in accordance with the teaching of the Karol et al patent.

In addition, another comparative catalyst (referred to herein as catalyst B) was prepared in a manner similar to that of the procedure of Example 1, except that titanium tetrachloride ($TiCl_4$) was used instead of the ethylaluminum dichloride and titanium (IV) isopropoxide used in Example 1.

COMPARATIVE EXAMPLE B

First Step 15 grams of Davison silica gel (dried at 200° C. for 4 hours) were placed into a 500 ml 4-neck reaction flask fitted with a dropping funnel, water condenser, dry nitrogen line, and overhead stirrer. Under a slow nitrogen purge, 200 ml of dry hexane was added to the silica while stirring. The silica/hexane slurry was brought to reflux temperature and 50 ml of 2.0M ethylmagnesium chloride in THF (EtMgCL/THF) solution was added dropwise (about 15 minutes) and the reflux was continued for an additional 30 minutes. After this time, the solvents were removed by distillation and the silica dried at 80° C. under a nitrogen purge. Total yield: 29 grams; theoretical Mg content: 3.45 mmols/gm.

Second Step 15 grams of the First Step reaction product (51.7 mmols of Mg) were placed into a 500 ml reaction flask (apparatus as described above). 200 ml of n-heptane containing 10.0 ml (91 mmols) of $TiCl_4$ was added to the flask while stirring. The slurry was refluxed for 45 minutes. After this time, the slurry was cooled to room temperature, transferred to a filter flask (under nitrogen), filtered, washed with four 100 ml portions of hexane and dried under nitrogen purge. The analyzed product contained 1.65 mmols/gm. of Mg and 1.24 mmols/gm of Ti. This analysis compared favorably with the calculated (theoretical) amount of Mg of 1.67 mmols/gm.

The catalysts of Examples 1–9 were then used to polymerize ethylene (Examples 10–22), and ethylene/hexene mixtures (Examples 23–37). The polymerization procedures are summarized below.

EXAMPLES 10–22

(Ethylene Homopolymerization)

Catalysts were initially tested in a 1.6 liter autoclave slurry reactor and in a representative experiment, 1.0 liter of hexane was added to the autoclave while at ambient temperature. 0.047 gr of catalyst (containing 0.06 mmols of Ti) was slurried into about 50 ml of hexane to which was added a sufficient amount of triethylaluminum (activator) to give an Al/Ti ratio of 40. This catalyst slurry was transferred to the reactor using slight nitrogen pressure and 0.03 moles of hydrogen were added by measuring through a calibrated Hoke bomb.

The stirring rate was adjusted to 1000 rpm and the temperature control unit set to 80° C. Ethylene pressure was introduced when the autoclave reached 40° C., and the total reactor pressure was adjusted to 115 psi.

Polymerizations were continued for 25-35 minutes in order to produce 100-300 grams of polymer.

About 400 ppm of Irganox 1076, an antioxidant stabilizer produced by Ciba-Geigy Corporation, was added to the polymer/hexane slurry and the hexane was allowed to evaporate under a hood. The products were placed into a vacuum oven overnight at approximately 60° C. to remove residual hexane and monomer.

Results are summarized in Table II.

That ability was measured by determining the hexene incorporation factor (HIF) which is a measure of branch frequency vs comonomer/ethylene ratio for a particular catalyst. The hexene incorporation factors are shown in Table IV for the catalyst of Examples 1, 5 9 and comparative catalysts A & B.

The data of Table IV illustrates that catalysts of Examples 1 and 5 exhibit hexene incorporation factors comparable to comparative catalyst A, while the catalyst of Example 9 is somewhat poorer in the hexene incorporation characteristics.

TABLE II

SUMMARY OF ETHYLENE HOMOPOLYMER DATA

| | Catalysts of | | Experimental Conditions | | | | Results | | | | Product |
|---|---|---|---|---|---|---|---|---|---|---|---|
| Example | Example | (Ratio)[1] | Grams Catalyst | $H_2/C_2$ | Ethylene Conc. (M/liter) | Polymer Yield (Grams) | Polymerization Time (Minutes) | Activity[2] | $I_2$[3] | $I_{21}$[4] | MFR[5] | Density (Gr/cc) |
| 10 | 3 | (1.0) | 0.602 | 0.604 | 0.495 | 98.5 | 69 | 240 | 2.13 | 64.5 | 30.3 | 0.967 |
| 11 | 2 | (1.9) | 0.300 | 0.335 | 0.597 | 174 | 90 | 650 | 0.81 | 25.3 | 31.2 | 0.958 |
| 12 | 1 | (1.9) | 0.300 | 0.142 | 0.705 | 197.5 | 61 | 920 | No Flow | 5.0 | — | 0.958 |
| 13 | 1 | (1.9) | 0.300 | 0.611 | 0.490 | 127 | 100 | 520 | 3.61 | 111.9 | 31.0 | 0.964 |
| 14 | 1 | (1.9) | 0.306 | 0.142 | 0.705 | 185.5 | 60 | 860 | No Flow | 3.99 | — | 0.957 |
| 15 | 4 | (2.9) | 0.605 | 0.611 | 0.490 | 257 | 65 | 800 | 1.61 | 58.9 | 36.6 | 0.965 |
| 16 | 5 | (3.9) | 0.311 | 0.142 | 0.705 | 188.5 | 62 | 830 | No Flow | 1.52 | — | 0.953 |
| 17 | 5 | (3.9) | 0.603 | 0.611 | 0.490 | 159.5 | 61 | 530 | 0.59 | 24.5 | 41.7 | 0.762 |
| 18 | 6 | (3.9) | 0.609 | 0.588 | 0.514 | 314 | 78 | 770 | 2.49 | 74.7 | 30.0 | 0.967 |
| 19 | 7 | (5.8) | 0.602 | 0.598 | 0.500 | ~250 | 48 | 1040 | 0.117 | 7.1 | 60.7 | 0.960 |
| 20 | 8 | (7.0) | 0.304 | 0.335 | 0.597 | 117 | 103 | 375 | No Flow | 0.81 | — | 0.952 |
| 21 | 9 | (7.7) | 0.303 | 0.142 | 0.705 | 157 | 60 | 735 | No Flow | 0.197 | — | 0.951 |
| 22 | 9 | (7.7) | 0.600 | 0.598 | 0.500 | 123 | 77 | 320 | No Flow | No Flow | — | — |

[1]EADC/TTP Ratio in Catalyst Preparation
[2]Activity = Gram polyethylene/gr Catalyst/Hour/Mole of ethylene/liter
[3]$I_2$ = Melt Index (gr/10 min)
[4]$I_{21}$ = Flow Index or High Load Melt Index (gr/10 min)
[5]Melt flow ratio ($I_{21}/I_2$)

EXAMPLES 23-37

(Ethylene/Hexene Copolymerization)

Ethylene/1-hexene copolymers were prepared under similar conditions as ethylene homopolymers of Examples 10-22 with catalysts of Examples 1-9, Table III. Table III summarizes the polymerization conditions and product properties of $C_2/C_6$ copolymers.

The catalyst of Example 5 gave products with good film tear strength properties indicating that it may be utilized for producing film useful in the bread-bag market. For example, a medium stiffness product with a density of about 0.930 gms/cc and $I_2$ Melt Index of about 1-2 may be utilized for such a market. However, the comonomer incorporation properties of the catalysts of this invention do not appear to be superior to

TABLE III

SUMMARY OF ETYLENE/HEXENE COPOLYMER DATA

| | Catalysts of | | Experimental Conditions | | | | | Polymerization | Results | | | | |
|---|---|---|---|---|---|---|---|---|---|---|---|---|---|
| Example | Example | Ratio[1] | Grams Catalyst | $H_2/C_2$ Vapor Phase | $C_6/C_2$ Vapor Phase | $C_6/C_2$ Slurry Phase | Ethylene Conc. (M/liter) | Polymer Yield Grams | Time (Minutes) | Activity[2] | $I_2$[3] | $I_{20}$[4] | MFR[5] | Density (gr/cc) |
| 23 | 3 | (1.0) | 0.251 | 0.300 | 0.05 | 1.85 | 0.629 | 138 | 86 | 610 | 4.47 | 128.4 | 28.7 | 0.938 |
| 24 | 2 | (1.9) | 0.205 | 0.191 | 0.0429 | 1.44 | 0.665 | 191.5 | 40 | 2100 | 1.36 | 38.6 | 28.4 | 0.936 |
| 25 | 1 | (1.9) | 0.212 | 0.191 | 0.0429 | 1.44 | 0.665 | 242.5 | 40 | 2580 | 0.88 | 27.7 | 31.5 | 0.936 |
| 26 | 1 | (1.9) | 0.151 | 0.187 | 0.0523 | 1.75 | 0.670 | 251 | 47 | 3167 | 2.02 | 61.4 | 30.4 | 0.930 |
| 27 | 1 | (1.9) | 0.078 | 0.187 | 0.0519 | 1.74 | 0.674 | 161 | 108 | 1700 | 0.90 | 26.5 | 29.4 | 0.933 |
| 28 | 1 | (1.9) | 0.153 | 0.186 | 0.0509 | 1.70 | 0.677 | 292 | 55 | 3075 | 1.71 | 47.9 | 28.0 | 0.934 |
| 29 | 4 | (2.9) | 0.108 | 0.305 | 0.0575 | 1.92 | 0.618 | 237 | 60 | 3550 | 3.40 | 101 | 29.7 | 0.937 |
| 30 | 5 | (3.9) | 0.209 | 0.196 | 0.0436 | 1.47 | 0.651 | 205 | 30 | 3010 | 0.66 | 25.8 | 39.1 | 0.930 |
| 31 | 5 | (3.9) | 0.079 | 0.251 | 0.0547 | 1.83 | 0.638 | 184 | 70 | 3130 | 1.44 | 49.6 | 34.4 | 0.929 |
| 32 | 5 | (3.9) | 0.104 | 0.248 | 0.0550 | 1.85 | 0.633 | 251 | 50 | 4575 | 1.15 | 37.4 | 32.5 | 0.933 |
| 33 | 6 | (3.9) | 0.175 | 0.305 | 0.0575 | 1.92 | 0.618 | 166 | 68 | 1355 | 4.17 | 121.8 | 29.2 | 0.937 |
| 34 | 7 | (5.8) | 0.100 | 0.382 | 0.0609 | 2.03 | 0.574 | 140 | 60 | 2440 | | | | |
| 35 | 9 | (7.7) | 0.209 | 0.188 | 0.0419 | 1.40 | 0.678 | 112.5 | 52 | 916 | 0.18 | 10.4 | 57.8 | 0.940 |
| 36 | 9 | (7.7) | 0.151 | 0.311 | 0.0577 | 1.93 | 0.605 | 91 | 105 | 570 | 0.77 | 39.6 | 51.4 | 0.939 |
| 37 | 9 | (7.7) | 0.406 | 0.309 | 0.0580 | 1.94 | 0.608 | 163 | 57 | 695 | 0.49 | 26.8 | 54.6 | 0.937 |

[1]EADC/TTP Ratio in Catalyst Preparation.
[2]Activity - Gram polyethylene/gr Catalyst/Hour/Mole of ethylene/liter.
[3]$I_2$ = Melt Index (gr/10 min)
[4]$I_{21}$ = Flow Index or High Load Melt Index (gr/10 min)
[5]Melt flow ratio ($I_{21}/I_2$)

The catalysts of Examples 1-9 were also compared with comparative catalysts A & B for their ability to incorporate hexene into the ethylene polymer chain.

those of comparative catalysts, and therefore linear low density polyethylene (LLDPE) ethylene/1-hexene copolymer products with densities lower than about 0.920 gms/cc may not be obtained in commercially sufficient quantities in gas phase fluid bed reactors. The catalysts, however, may be used to produce polymers having a relatively low melt flow ratio of about 25 to about 65 which may be used in the injection molding processes. Ethylene/1-butene copolymer products may be obtained with densities between about 0.916 and about 0.965 gms/cc.

TABLE IV
RELATIVE HEXENE INCORPORATION FACTORS FOR VARIOUS CATALYSTS

| Catalyst of Example | Ratio (EADC/TTP) | Hexene Incorporation Factor | Approximate[1] Density (grams/cc) at Constant Condtions |
|---|---|---|---|
| 1 | (1.9) | 5.3 | 0.931 |
| 5 | (3.9)[2] | 4.9 | 0.932 |
| 9 | (7.7) | 3.1 | 0.940 |
| A |  | 5.0 | 0.931 |
| B |  | 6.0–12.8 | 0.916–0.926 |

[1]At a hexene/ethylene ratio of 1.4 (laboratory slurry reactor).
[2]This catalyst produced $C_2/C_6$ copolymer with good tear strength at 0.9327 gm/cc density; MD = 142, TD = 354 (gms/mil).

Figure 2:
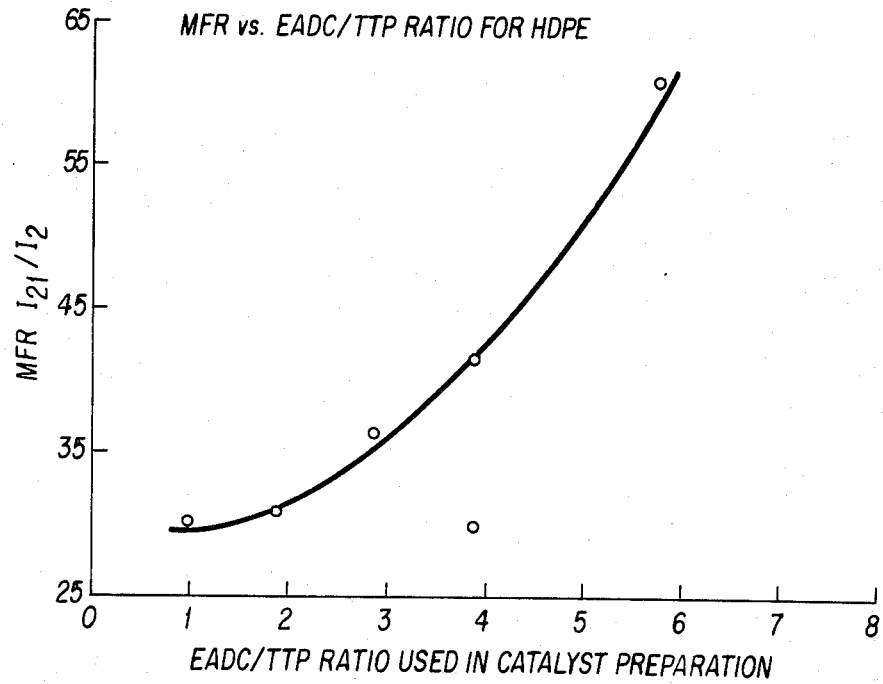
FIG. 2 is a graph showing the effect of the ethyl aluminum dichloride (EADC) to titanium tetraisopropoxide (TTP) ratio (EADC/TTP) on the melt flow ratio of high density polyethylene products prepared with catalysts of Examples 1-9.

FIG. 2 illustrates the effect of EADC/TTP ratio on the melt flow ratio for the preparation of high density polyethylene products (HDPE). One catalyst (Example 6 in Table I) exhibited atypical properties.

Figure 3:
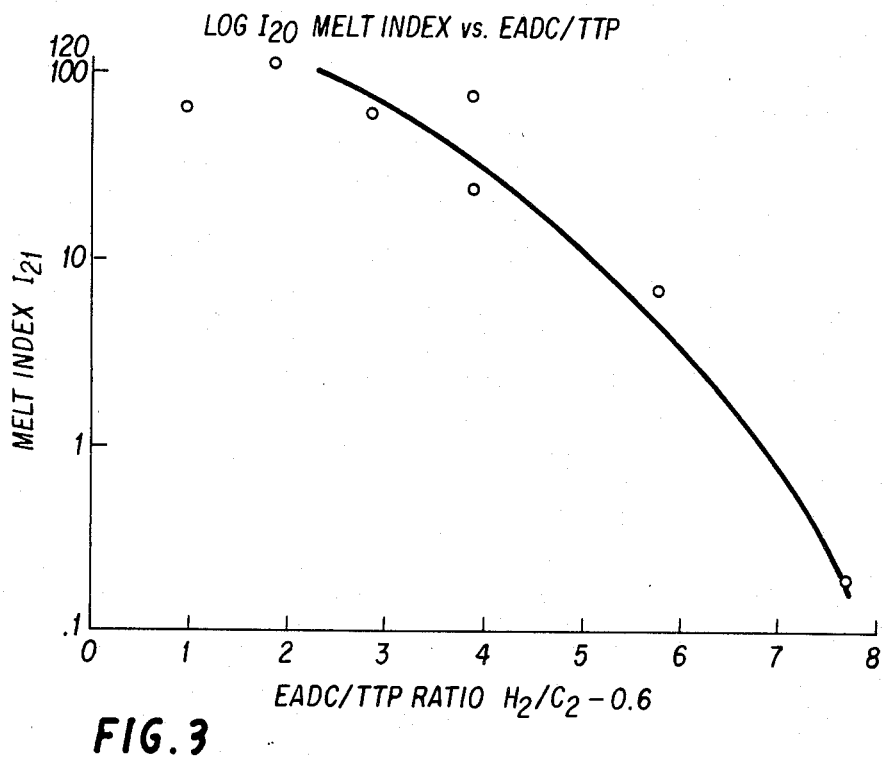
FIG. 3 is a graph showing the effect of the EADC/TTP ratio on the melt index ($I_{21}$), at a constant hydrogen/ethylene ratio, of polymer products prepared with catalysts of Examples 1-9.

FIG. 3 shows the effect of EADC/TTP ratio on the melt index ($I_{21}$) at a constant hydrogen/ethylene ratio. Catalysts prepared with low EADC/TTP ratios produced products with lower MFR and higher $I_{21}$ melt index values than catalysts prepared at high EADC/TTP ratios.

Figure 4:
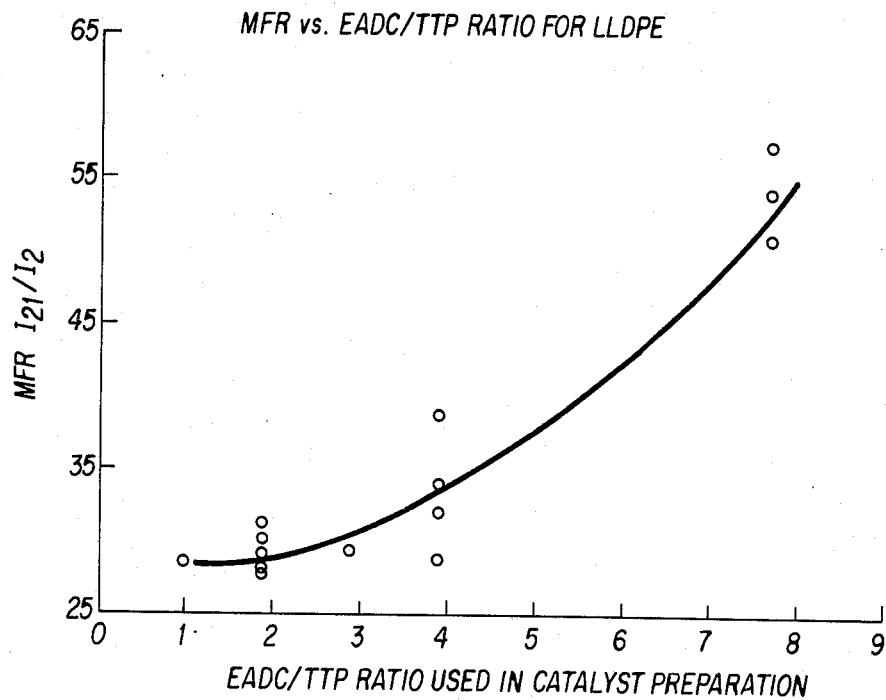
FIG. 4 is a graph of the activity of the catalysts of Examples 1-9 as a function of the EADC/TTP ratio for the high density polyethylene (HDPE) and linear, low density polyethylene (LLDPE) products.

FIG. 4 shows the effect of EADC/TTP ratio on the melt flow ratio for ethylene/1-hexene copolymers prepared with these catalysts. The same trend is observed as in the case of the HDPE products except that the MFR values may be somewhat lower (28-30) for the copolymers at low EADC/TTP ratios.

Figure 5:
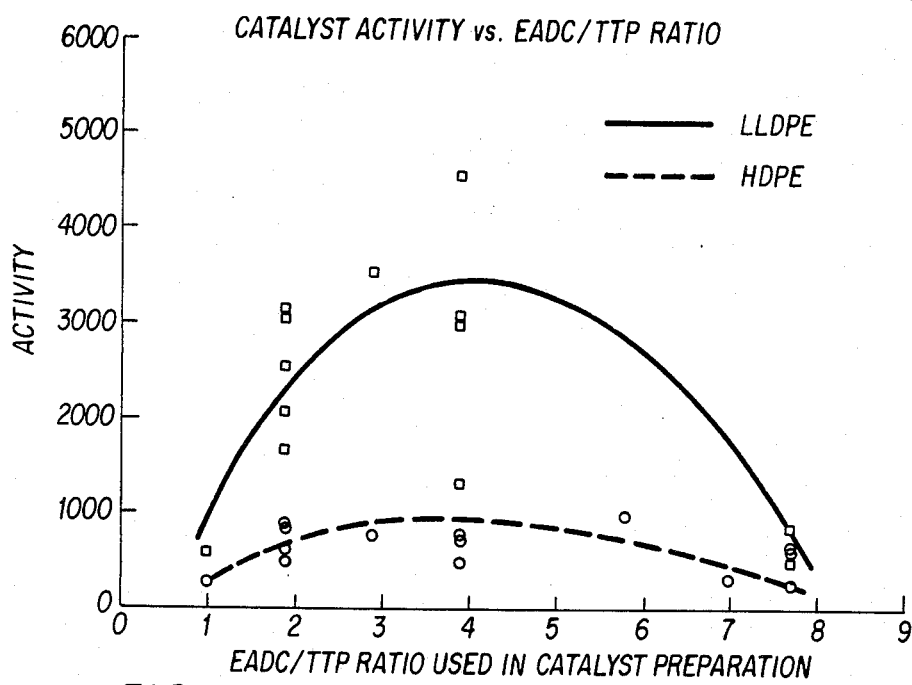
FIG. 5 is a graph comparing the activity of the catalyst when preparing homopolymers and copolymers.

FIG. 5 shows that the activity of these catalysts is higher for the preparation of copolymers relative to homopolymers with a broad maximum in activity observed at the EADC/TTP ratios of 3-5.

As the data of FIGS. 2-5 illustrates, the amount of ethylaluminum dichloride (and therefore the mole ratio of ethylaluminum dichloride to titanium tetraisopropoxide used in the synthesis of the catalysts of this invention) has a direct effect on the melt flow ratio in the resulting polymer. Catalysts with low EADC/TTP mole ratios of about 2:1 produce polymers with low MFR values of about 28-32, while catalysts of higher mole ratios of EADC/TTP of about 8:1 produce polymers with MFR values of between 50-60.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A process for preparing a supported catalyst composition for use in alpha-olefin polymerization reactions, said process consisting essentially of the following steps in the recited order:
   (i) contacting a solid, porous carrier having reactive OH groups with a liquid, said liquid containing at least one organomagnesium composition having the empirical formula $$R_nMgR'_{(2-n)} \qquad (I)$$

where R and R' are the same or different and they are $C_1$–$C_{12}$ hydrocarbyl groups, provided that R' may also be halogen, and n is 0, 1, or 2, the number of moles of said organomagnesium composition being in excess of the number of moles of said OH groups on said carrier;
   (ii) removing said liquid from step (i) to obtain a magnesium-containing carrier in the form of a dry, free-flowing powder; and
   (iii) contacting said powder of step (ii) with a solution comprising a liquid medium, an aluminum-containing brominating and/or chlorinating agent having the formula:

$$R'''_pAlX_{(3-p)}$$

wherein R''' is a $C_1$–$C_{12}$ branched or unbranched alkyl group, X is bromine or chlorine, and p is 1 or 2, and at least one titanium (IV) alkoxide compound having the formula :

$$Ti(OR'')_m$$

wherein R'' is branched or unbranched alkyl radical of 1 to 20 carbon atoms and m is 4, said titanium (IV) alkoxide compound, said brominating and/or chlorinating agent being soluble in said liquid medium, and said magnesium-containing carrier being substantially insoluble in said liquid medium, whereby a compound of titanium which is insoluble in said liquid medium becomes incorporated onto said carrier.

2. A process of claim 1 wherein the number of moles of said titanium (IV) alkoxide compound present in said solution of step (iii) is in excess of the number of moles of the organomagnesium composition used in step (i).

3. A process of claim 2 wherein the solid, porous carrier, prior to contact thereof with liquid in step (i), is heated at a temperature of about 100° C. to about 1000° C.

4. A process of claim 3 wherein the solid, porous carrier is heated at a temperature of about 150° C. to about 850° C.

5. A process of claim 4 wherein the carrier is heated at a temperature of about 800° C.

6. A process of claim 5 wherein the heating is continued until the carrier contains about 0.5 to about 5 mmoles of the OH groups per gram of carrier.

7. A process of claim 6 wherein the heating is continued until the carrier contains about 0.3 to about 0.7 mmoles of the OH groups per gram of carrier.

8. A process of claim 7 wherein the carrier is silica having a surface hydroxyl group concentration of about 0.5 mmoles/gr, a surface area of 300 $m^2$/gram and a pore volume of 1.65 $m^3$/gram.

9. A process of claim 8 wherein R is a $C_1$–$C_4$ alkane group and R' is a halogen.

10. A process of claim 9 wherein R' is bromine or chlorine.

11. A process of claim 10 wherein the organomagnesium composition is ethylmagnesium chloride.

12. A process of claim 11 wherein the liquid containing ethylmagnesium chloride is tetrahydrofuran.

13. A process of claim 12 wherein said liquid is removed in step (ii) by evaporation.

14. A process of claim 13 wherein the molar ratio of the organomagnesium composition to the number of moles of the OH groups on the carrier is about 1.1 to about 3.5.

15. A process of claim 14 wherein R" is a branched or unbranched alkyl radical of 1 to 6 carbon atoms.

16. A process of claim 15 wherein R" is isopropoxide.

17. A process of claim 16 wherein R''' is $C_1$-$C_4$ branched or unbranched alkyl group.

18. A process of claim 17 wherein the brominating or chlorinating agent is ethylaluminum dichloride.

19. A process of claim 18 wherein the molar ratio of the brominating and/or chlorinating agent to the titanium alkoxide compound is about 2:1 to about 15:1.

20. A process of claim 19 wherein the molar ratio of ethylaluminum dichloride to titanium isoproxide ranges from about 2:1 to about 8:1.

21. A supported catalyst composition for use in alpha-olefin polymerization reactions prepared by the process consisting essentially of the following steps conducted in the recited order:
(i) contacting a solid, porous carrier having reactive OH groups with a liquid, said liquid containing at least one organomagnesium composition having the empirical formula $$R_n MgR'_{(2-n)} \qquad (I)$$

where R and R' are the same or different and they are $C_1$-$C_{12}$ hydrocarbyl groups, provided that R' may also be halogen, and n is 0, 1 or 2, the number of moles of said organomagnesium composition being in excess of the number of moles of said OH groups on said carrier;
(ii) removing said liquid from step (i) to obtain a magnesium-containing carrier in the form of a dry, free-flowing powder; and
(iii) contacting said powder of step (ii) with a solution comprising a liquid medium, an aluminum-containing brominating and/or chlorinating agent having the formula:

$$R'''_p AlX_{(3-p)}$$

wherein R''' is a $C_1$-$C_{12}$ branched or unbranched alkyl group, X is bromine or chlorine, and p is 1 or 2, and at least one titanium (IV) alkoxide compound having the formula:

$$Ti(OR'')_m$$

wherein R" is a branched or unbranched alkyl radical of 1 to 20 carbon atoms and m is 4, said titanium (IV) alkoxide compound and said brominating and/or chlorinating agent being soluble in said liquid medium, and said magnesium-containing carrier being substantially insoluble in said liquid medium,
whereby a compound of titanium which is insoluble in said liquid medium becomes incorporated onto said carrier.

22. A catalyst composition of claim 21 wherein the number of moles of said titanium (IV) alkoxide compound present in said solution of step (iii) is in excess of the number of moles of the organomagnesium composition used in step (i).

23. A catalyst composition of claim 22 wherein the solid, porous carrier, prior to contact thereof with the liquid in step (i), is heated at a temperature of about 100° C. to about 1000° C.

24. A catalyst composition of claim 23 wherein the solid, porous carrier is heated at a temperature of about 150° C. to about 850° C.

25. A catalyst composition of claim 24 wherein the carrier is heated at a temperature of about 800° C.

26. A catalyst composition of claim 25 wherein the heating is continued until the carrier contains about 0.5 to about 5 mmoles of the OH groups per gram of carrier.

27. A catalyst composition of claim 26 wherein the heating is continued until the carrier contains about 0.3 to about 0.7 moles of the OH groups per gram of carrier.

28. A catalyst composition of claim 27 wherein the carrier is silica having a surface hydroxyl group concentration of about 0.5 mmoles/gr, a surface area of 300 m²/gram and a pore volume of 1.65 m³/gram.

29. A catalyst composition of claim 28 wherein R is a $C_1$-$C_4$ alkane group and R' is halogen.

30. A catalyst composition of claim 29 wherein R' is bromine or chlorine.

31. A catalyst composition of claim 30 wherein the organomagnesium composition is ethylmagnesium chloride.

32. A catalyst composition of claim 31 wherein the liquid containing ethylmagnesium chloride is tetrahydrofuran.

33. A catalyst composition of claim 32 wherein said liquid is removed in step (ii) by evaporation.

34. A catalyst composition of claim 33 wherein the molar ratio of the organomagnesium composition to the number of moles of the OH groups on the carrier is about 1.1 to about 3.5.

35. A catalyst composition of claim 34 wherein R" is a branched or unbranched alkyl radical of 1 to 6 carbon atoms.

36. A catalyst composition of claim 35 wherein R" is isopropoxide.

37. A catalyst composition of claim 36 wherein R''' is $C_1$-$C_4$ branched or unbranched alkyl group.

38. A catalyst composition of claim 37 wherein the brominating and/or chlorinating agent is ethylaluminum dichloride.

39. A process of claim 38 wherein the molar ratio of the brominating and/or chlorinating agent to the titanium alkoxide compound is about 2:1 to about 15:1.

40. A catalyst composition of claim 39 wherein the molar ratio of ethylaluminum dichloride to titanium isoproxide ranges from about 2:1 to about 8:1.

41. A process for preparing a polymer of at least one $C_2$-$C_{10}$ alphaolefin, the polymer having MFR values of about 25 to about 65, polymer containing at least about 80 percent by weight of ethylene units, the process comprising conducting the polymerization in the presence of a catalyst prepared by a process consisting essentially of the following steps conducted in the recited order:
(i) contacting a solid, porous carrier having reactive OH groups with a liquid, said liquid containing at least one organomagnesium composition having the empirical formula $$R_nMgR'_{(2-n)} \quad (I)$$

where R and R' are the same or different and they are $C_1$-$C_{12}$ hydrocarbyl groups, provided that R' may also be a halogen, and n is 0, 1 or 2, the number of moles of said organomagnesium composition being in excess of the number of moles of said OH groups on said carrier;

(ii) removing said liquid from step (i) to obtain a magnesium-containing carrier in the form of a dry, free-flowing powder; and (iii) contacting said powder of step (ii) with a solution comprising a liquid medium, an aluminum-containing brominating and/or chlorinating agent having the formula:

$$R'''_pAlX_{(3-p)}$$

wherein R''' is a $C_1$-$C_{12}$ branched or unbranched alkyl group, X is bromine or chlorine, and p is 1 or 2, and at least one titanium (IV) alkoxide compound having the formula:

$$Ti(OR'')_m$$

wherein R'' is a branched or unbranched alkyl radical of 1 to 20 carbon atoms and m is 4, said titanium (IV) alkoxide compound and said brominating and/or chlorinating agent being soluble in said liquid medium, and said supported magnesium-containing carrier being substantially insoluble in said liquid medium, the molar ratio of said brominating and/or chlorinating agent to said titanium (IV) alkoxide compound being sufficient to produce said alpha-olefin polymers having MFR values of about 25 to about 65, whereby a compound of titanium which is insoluble in said liquid medium becomes incorporated onto said carrier.

42. A process of claim 41 wherein the number of moles of said titanium (IV) alkoxide compound present in said solution of (iii) is in excess of the number of moles of the organomagnesium composition used in step (i).

43. A process of claim 42 wherein the polymer is selected from the group consisting of ethylene homopolymer, ethylene/1-butene copolymer, ethylene/1-hexene copolymer, ethylene/4-methyl-1-pentene copolymer, ethylene/1-butene/1-hexene terpolymer and ethylene/propylene/1-butene terpolymer.

44. A process of claim 43 wherein the polymer is an ethylene/1-hexene copolymer having a density of about 0.910 to about 0.970 gms/cc.

45. A process of claim 44 wherein the molar ratio of the brominating and/or chlorinating agent to the titanium alkoxide compound is about 1:1 to about 30:1.

46. A process of claim 45 wherein the molar ratio of the brominating and/or chlorinating agent to the titanium alkoxide compound is about 2:1 to about 15:1.

47. A process of claim 46 wherein the molar ratio of the brominating and/or chlorinating agent to the titanium alkoxide compound is about 2:1 to about 8:1.

48. A process of claim 47 wherein the number of moles of said titanium (IV) alkoxide compound present in said solution of step (iii) is in excess of the number of moles of the organomagnesium composition used in step (i).

49. A process of claim 48 wherein the solid, porous carrier, prior to contact thereof with the liquid in step (i), is heated at a temperature of about 100° C. to about 1000° C.

50. A process of claim 49 wherein the solid, porous carrier is heated at a temperature of about 150° C. to about 850°.

51. A process of claim 50 wherein the carrier is heated at a temperature of about 800° C.

52. A process of claim 51 wherein the heating is continued until the carrier contains about 0.5 to about 5 mmoles of the OH groups per gram of carrier.

53. A process of claim 52 wherein the heating is continued until the carrier contains about 0.3 to about 0.7 mmoles of the OH groups per gram of carrier.

54. A process of claim 53 wherein the carrier is silica having a surface hydroxyl group concentration of about 0.5 mmoles/gr, a surface area of 300 m²/gram and a pore volume of 1.65 m³/gram.

55. A process of claim 54 wherein R is a $C_1$-$C_4$ alkane group and R' is a halogen.

56. A process of claim 55 wherein R' is bromine or chlorine.

57. A process of claim 56 wherein the organomagnesium composition is ethylmagnesium chloride.

58. A process of claim 57 wherein the liquid containing ethylmagnesium chloride is tetrahydrofuran.

59. A process of claim 58 wherein said liquid is removed in step (ii) by evaporation.

60. A process of claim 59 wherein the molar ratio of the organomagnesium composition to the number of moles of the OH groups on the carrier is about 1.1 to about 3.5.

61. A process of claim 60 wherein R'' is a branched or unbranched alkyl radical of 1 to 6 carbon atoms.

62. A process of claim 61 wherein R'' is isopropoxide.

63. A process of claim 62 wherein R''' is a $C_1$-$C_4$ branched or unbranched alkyl group.

64. A process of claim 63 wherein the brominating or chlorinating agent is ethylaluminum dichloride.

65. A supported catalyst composition for use in alpha-olefin polymerization reactions prepared by the process consisting essentially of the following steps conducted in the recited order:

(i) contacting a solid, porous carrier having reactive OH groups with a liquid, said liquid containing at least one organomagnesium composition having the empirical formula $$R_nMgR'_{(2-n)} \quad (I)$$

where R and R' are the same or different and they are $C_1$-$C_{12}$ hydrocarbyl groups, provided that R' may also be a halogen, and n is 0, 1 or 2;

(ii) removing said liquid from step (i) to obtain a magnesium-containing, dry, free-flowing powder; and (iii) contacting said powder of step (ii) with a solution comprising a liquid medium, an aluminum-containing brominating and/or chlorinating agent having the formula:

$$R'''_pAlX_{(3-p)}$$

wherein R''' is a $C_1$-$C_{12}$ branched or unbranched alkyl group, X is bromine or chlorine, and p is 1 or 2, and at least one titanium (IV) alkoxide compound having the formula:

$$Ti(OR'')_m$$

wherein R" is a branched or unbranched alkyl radical of 1 to 20 carbon atoms and m is 4, the number of moles of said titanium (IV) alkoxide compound being in excess of the number of moles of said organomagnesium composition in step (i), said titanium (IV) alkoxide compound and said brominating and/or chlorinating agent being soluble in said liquid medium, and said magnesium-containing carrier being substantially insoluble in said liquid medium, whereby a compound of titanium which is insoluble in said liquid medium becomes incorporated onto said carrier.

66. A catalyst composition of claim 65 wherein the molar ratio of the brominating and/or chlorinating agent to the titanium alkoxide compound is about 1:1 to about 30:1.

67. A catalyst composition of claim 66 wherein the molar ratio of the brominating and/or chlorinating agent to the titanium alkoxide compound is about 2:1 to about 15:1.

68. A catalyst composition of claim 67 wherein the molar ratio of the brominating and/or chlorinating agent to the titanium alkoxide compound is about 2:1 to about 8:1.

69. A catalyst composition of claim 68 wherein the number of moles of said titanium (IV) alkoxide compound present in said solution of step (iii) is in excess of the number of moles of the organomagnesium composition used in step (i).

70. A catalyst composition of claim 69 wherein the molar ratio of tetravalent of the titanium (IV) alkoxide compound to the organomagnesium composition is about 3 to about 6.

71. A catalyst composition of claim 70 wherein the solid, porous carrier, prior to contact thereof with the liquid in step (i), is heated at a temperature of about 100° C. to about 1000° C.

72. A catalyst composition of claim 71 wherein the solid, porous carrier is heated at a temperature of about 150° C. to about 850°.

73. A catalyst composition of claim 72 wherein the carrier is heated at a temperature of about 800° C.

74. A catalyst composition of claim 73 wherein the heating is continued until the carrier contains about 0.5 to about 5 mmoles of the OH group per gram of carrier.

75. A catalyst composition of claim 74 wherein the heating is continued until the carrier contains about 0.3 to about 0.7 mmoles of the OH groups per gram of carrier.

76. A catalyst composition of claim 75 wherein the carrier is silica having a surface hydroxyl group concentration of about 0.5 mmoles/gr, a surface area of 300 $m^2$/gram and a pore volume of 1.65 $m^3$/gram.

77. A catalyst composition of claim 76 wherein R is a $C_1-C_4$ alkane group and R' is a halogen.

78. A catalyst composition of claim 77 wherein R' is bromine or chlorine.

79. A catalyst composition of claim 78 wherein the organomagnesium composition is ethylmagnesium chloride.

80. A catalyst composition of claim 79 wherein the liquid containing ethylmagnesium chloride is tetrahydrofuran.

81. A catalyst composition of claim 80 wherein said liquid is removed in step (ii) by evaporation.

82. A catalyst composition of claim 81 wherein the molar ratio of the organomagnesium composition to the number of moles of the OH groups on the carrier is about 1.1 to about 3.5.

83. A catalyst composition of claim 82 wherein R" is a branched or unbranched alkyl radical of 1 to 6 carbon atoms.

84. A catalyst composition of claim 83 wherein R" is isopropoxide.

85. A catalyst composition of claim 84 wherein R'" is a $C_1-C_4$ branched or unbranched alkyl group.

86. A catalyst composition of claim 85 wherein the brominating or chlorinating agent is ethylaluminum dichloride.

87. A catalyst composition of claim 86 wherein the molar ratio of the brominating and/or chlorinating agent to the titanium isopropoxide compound is about 2:1 to about 15:1.

88. A catalyst composition of claim 87 wherein the molar ratio of ethylaluminum dichloride to titanium isoproxide ranges from about 2:1 to about 8:1.

* * * * *

UNITED STATES PATENT AND TRADEMARK OFFICE
CERTIFICATE OF CORRECTION

PATENT NO. : 4,618,662

DATED : October 21, 1986

INVENTOR(S) : T. E. Nowlin

It is certified that error appears in the above-identified patent and that said Letters Patent is hereby corrected as shown below:

Col. 11, line 33, "unecessary" should be --unnecessary--.
Col. 25, line 14, "Condtions" shoulde be --conditions--.
Col. 26, Claim 1, line 8, before "halogen" insert --a--.
Col. 27, Claim 17, line 12, before "$C_1$-$C_4$" insert --a--.
Col. 27, Claim 21, line 35, before "halogen" insert --a--.
Col. 28, Claim 27, line 18, "moles" should be --mmoles--.
Col. 28, Claim 29, line 25, before "halogen" insert --a--.
Col. 28, Claim 39, line 1, change "process" to --catalyst composition--.
Col. 28, Claim 41, line 57, "alpHaolefin" should be --alpha olefin--.
Col. 28, Claim 41, line 58, before "polymer" insert --the--.
Col. 31, Claim 70, line 34, before "of" insert --titanium--.
Col. 32, Claim 88, line 44, "isoproxide" should be --isopropoxide--.

Signed and Sealed this

Eighteenth Day of February, 1992

Attest:

HARRY F. MANBECK, JR.

Attesting Officer

Commissioner of Patents and Trademarks